(12) United States Patent
Alanen et al.

(10) Patent No.: US 11,399,301 B2
(45) Date of Patent: Jul. 26, 2022

(54) COMMUNICATIONS APPARATUS AND METHODS

(71) Applicant: Nokia Solutions and Networks Oy, Espoo (FI)

(72) Inventors: Olli Alanen, Vantaa (FI); Enrico Henrik Rantala, Berkeley, CA (US); Mika Kasslin, Espoo (FI); Janne Marin, Espoo (FI); Veli-Matti Kolmonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 24 days.

(21) Appl. No.: 16/880,585

(22) Filed: May 21, 2020

(65) Prior Publication Data

US 2020/0374729 A1   Nov. 26, 2020

(30) Foreign Application Priority Data

May 22, 2019   (FI) ...................................... 20195423

(51) Int. Cl.
*H04B 7/0413*   (2017.01)
*H04W 24/10*   (2009.01)
(Continued)

(52) U.S. Cl.
CPC .......... *H04W 24/10* (2013.01); *H04B 7/0413* (2013.01); *H04L 5/0007* (2013.01); *H04L 5/0048* (2013.01); *H04W 72/08* (2013.01)

(58) Field of Classification Search
CPC ............... H04W 72/042; H04W 72/02; H04W 72/0413; H04W 92/12; H04W 72/087;
(Continued)

(56) References Cited

U.S. PATENT DOCUMENTS

2012/0243629 A1   9/2012   Van Houtum et al.
2013/0315191 A1*  11/2013  Yoshimoto ........... H04J 11/0056
                                                    370/329
(Continued)

FOREIGN PATENT DOCUMENTS

| CN | 102013959 A | 4/2011 |
| WO | WO 2010/018510 A2 | 2/2010 |
| WO | WO 2011/073836 A1 | 6/2011 |

OTHER PUBLICATIONS

Xu Zhang et al., "CSIsnoop: Inferring Channel State Information in Multi-User MIMO WLANs," IEEE/ACM Transactions on Networking IEEE, vol. 27, No. 1, pp. 231-244, Feb. 2019.

*Primary Examiner* — Rahel Guarino
(74) *Attorney, Agent, or Firm* — Fay Sharpe LLP

(57) ABSTRACT

Communications apparatuses and methods are provided. The solution comprises receiving (200) from a server a request to perform sensing measurements; allocating (202) transmission resources to one or more wireless terminal devices, where the allocated resources are larger than needed for data transmission of the one or more wireless terminal; transmitting (204) information on resource to the one or more wireless terminal devices; receiving (206) transmission from one or more wireless terminal devices, the transmission comprising an amount of known symbols in addition to data; estimating (208) channel state information utilizing the known symbols; and transmitting (210) channel state information to the server.

15 Claims, 2 Drawing Sheets

(51) Int. Cl.
*H04L 5/00* (2006.01)
*H04W 72/08* (2009.01)

(58) Field of Classification Search
CPC ............. H04W 72/1284; H04L 5/0007; H04L 5/0048; H04B 17/309
See application file for complete search history.

(56) References Cited

U.S. PATENT DOCUMENTS

| | | |
|---|---|---|
| 2014/0079011 A1* | 3/2014 | Wiberg ............... H04W 74/006 370/329 |
| 2017/0317805 A1 | 11/2017 | Hammarwall |
| 2018/0084543 A1 | 3/2018 | Lv et al. |
| 2018/0097596 A1* | 4/2018 | Palanivelu ............ H04L 5/0048 |
| 2018/0234222 A1 | 8/2018 | Jiang et al. |
| 2019/0068303 A1 | 2/2019 | Gao et al. |
| 2019/0110312 A1 | 4/2019 | Shimman et al. |

* cited by examiner

COMMUNICATIONS APPARATUS AND METHODS

TECHNICAL FIELD

The exemplary and non-limiting embodiments of the invention relate generally to communications.

BACKGROUND

Wireless telecommunication systems are under constant development. There is a constant need for higher data rates and high quality of service. Reliability requirements are constantly rising and ways and means to ensure reliable connections and data traffic while keeping transmission delays minimal are constantly under development.

Developing networks enable new services to customers. One new service under development is sensing, where signals between a base station or access point and a wireless terminal are utilized for obtaining information on the environment where the apparatuses operate.

BRIEF DESCRIPTION

According to some suitable embodiment, there is provided an apparatus, method, and/or computer-readable medium as detailed in the appended claims.

One or more examples of implementations are set forth in more detail in the accompanying drawings and the description below. Other features will be apparent from the description and drawings, and from the claims.

The embodiments and features described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
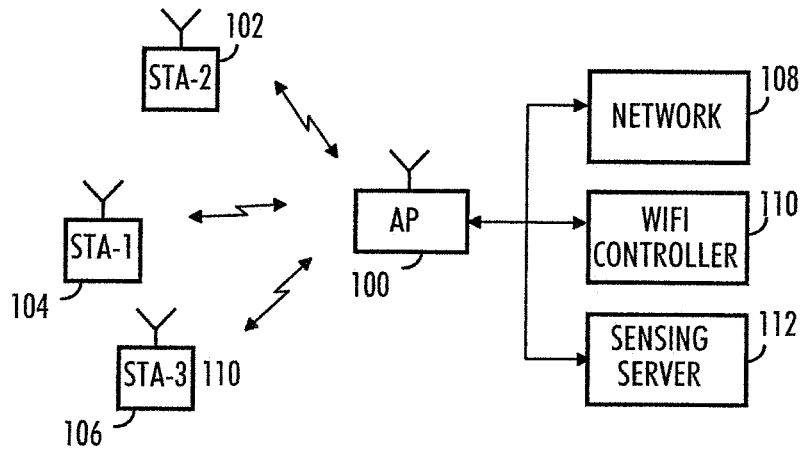
FIG. 1 illustrates an example of a communication environment where some embodiments of the invention may be applied.

A general wireless communication scenario to which embodiments of the invention may be applied is illustrated in FIG. 1. FIG. 1 illustrates an example of wireless communication devices comprising one or more access points (AP) 100 and a plurality of wireless terminal devices (STA) 102, 104, 106. In an embodiment, the access point may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The AP 100 may also provide access to other networks 108, e.g. the Internet. In another embodiment, the BSS may comprise a plurality of APs to form an extended service set (ESS). While embodiments of the invention are described in the context of the above-described topologies of IEEE 802.11 based networks, it should be appreciated that these or other embodiments of the invention may be applicable to networks based on other specifications, e.g. different versions of the IEEE 802.11.

In an embodiment, the infrastructure comprises a Wi-Fi controller or WLAN controller 110, especially if the infrastructure comprises a multitude of APs. The Wi-Fi controller may be configured to control the operation of APs, provide common operating parameters and operation settings. This removes the need to manage APs individually. The Wi-Fi controller may be a separate apparatus as illustrated in FIG. 1 or respective functions may also be divided to several apparatuses such as individual APs.

While embodiments of the invention are described in the context of the above-described topologies of IEEE 802.11 specifications, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), LTE-Advanced, a fifth generation cellular communication system (5G), and other networks having cognitive radio features, e.g. transmission medium sensing features and adaptiveness to coexist with radio access networks based on different specifications and/or standards.

Wi-Fi sensing is a new topic which has emerged in the development or wireless networks. In Wi-Fi sensing, normal Wi-Fi signals are utilized as a kind of radar signals which may help collecting information about the environment where AP operate during normal operation. One suggested way of performing sensing is the usage of Channel State Information, CSI, determined by APs from signals transmitted by the STAs. Sensing could be performed based on estimates from all or selected received frames. Normally, CSI is measured from the Long training Field (LTF) of the Wi-Fi Protocol data Unit, PDU, and presents the properties of channel between the transmitter and receiver at that moment of time. The CSI samples from all the frames may be further analyzed to learn what is happening in the environment. In an embodiment, analyzing may utilize machine learning (ML).

With sensing, and end result of the sensing may be for example a 3D model of the house or apartment, including both static and dynamic information. The dynamic information may include for example how many persons are there inside the house, where they are located, what they are doing and how is their health.

To this end, the infrastructure may comprise a sensing server 112 configured to perform and coordinate the sensing operations. The sensing server may be connected to the APs 100 and Wi-Fi controller 110 of the infrastructure. The sensing server may be connected to other networks 108 such as the Internet.

A simple example of sensing in Wi-Fi infrastructure may be as follows. Consider a site comprising an AP 100 and two wireless terminal devices, STA-1 and STA-2 102, 104. In calibrating phase terminals devices may transmit PDUs to AP while site is empty of people. For each received PDU, the AP measures CSI and sends that to sensing server 112. The server is also informed that the space is empty. This way the server may obtain information on the static environment.

Next, STAs transmit PDUs to AP while space has a person (who may be moving). For each received PDU the AP measures CSI and sends that to sensing server. The server is also informed that the space had a person.

Next, STAs transmit PDUs to AP while space has two persons. As before, for each received PDU the AP measures CSI and sends that to sensing server. The server is also informed that the space had two persons. Based on the above information the sensing server may build a model for machine learning.

After this, STAs continue to transmit PDUs to AP, and CSI information is sent to sensing server. Now, the sensing server uses the earlier information for determining (based on machine learning) how many persons are at the moment in the space, movements and possible actions.

However, performing sensing in a Wi-Fi receiver based on CSI requires a known signal. An example of such a signal is the long training field (LTF) in the preamble. The LTF can be used to calculate a CSI estimate on the transmission, that can further be used to perform the environment sensing. However, the CSI from the LTF might not be always enough, for example if signal to noise ratio is low or if there are rapid changes in the channel.

Figure 2:
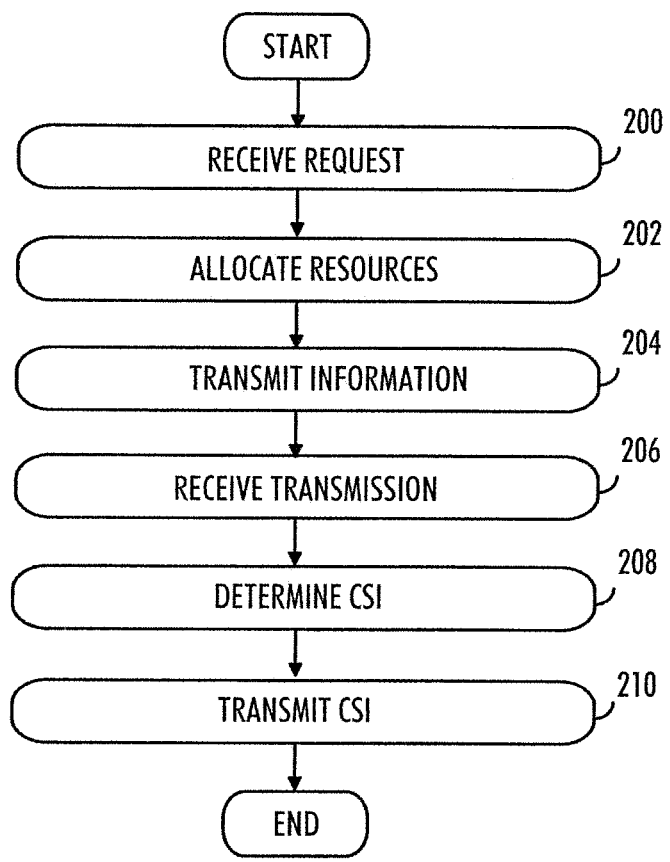
FIG. 2 is a flowchart illustrating an embodiment of the invention.

FIG. 2 is a flowchart illustrating an embodiment. FIG. 2 illustrates examples of the operation of an apparatus or a network element configured to control wireless terminal devices. In an embodiment, FIG. 2 illustrates the operation of an Access Point, AP.

In step 200 of FIG. 2, the apparatus is configured to receive from a server a request to perform sensing measurements. The sensing server 112 may have determined that there is not enough information for performing sensing. The performed CSI measurements made from the long training fields of frames received by the AP may have not provided enough data. The server may in such a case request the AP to perform more measurements.

In step 202 of FIG. 2, the apparatus is configured to allocate transmission resources to one or more wireless terminal devices, where the allocated resources are larger than needed for data transmission of the one or more wireless terminal. As the resources are larger than needed, extra padding may be added to the PDUs. The extra padding comprises symbols know to the AP and they may be thus utilized to determine CSI.

In step 204 of FIG. 2, the apparatus is configured to transmit information on resource to the one or more wireless terminal devices.

In step 206 of FIG. 2, the apparatus is configured to receive transmission from one or more wireless terminal devices, the transmission comprising an amount of known symbols in addition to data. The extra padding in the frame comprises known symbols.

In step 208 of FIG. 2, the apparatus is configured to estimate channel state information utilizing the known symbols.

In step 210 of FIG. 2, the apparatus is configured to transmit obtained channel state information to the server.

A working group developing 802.11ax, a new version of the wireless standard, has proposed to utilize two uplink communication methods: uplink Orthogonal Frequency Domain Multiple Access, ODFMA, and uplink Multi-User Multiple-Input-Multiple-Output, MU-MIMO. Both of the features are used to enable multiple associated wireless terminal devices, STAs, to transmit at the same time to the AP. The proposed methods differ in how uplink transmissions are multiplexed. In OFDMA, transmissions are multiplexed in frequency domain. In MU-MIMO, they are multiplexed in spatial domain. As those multiple simultaneous uplink transmissions may have different amounts of data, it is also possible that the lengths of the transmissions in time are different. Still the specification defines that the transmissions must end at the same time and therefore the wireless terminal devices, STAs, need to use some padding in the end of the frames to make them equally long. The content of the padding is undefined according to the specification.

In the proposed solution, the padding comprises symbols known to the AP and thus the symbols may be utilized in CSI determination.

If the sensing server considers that the CSI measurements from the LTFs of received frames are insufficient, the sensing server may request the Wi-Fi network to provide more measurements. In case the AP is using MU-MIMO or OFDMA in the uplink transmissions, the AP may allocate longer Transmission opportunity TxOP than is needed for data. A TxOP is a bounded time interval during which an STA can send as many frames as possible (as long as the duration of the transmissions does not extend beyond the maximum duration of the TXOP). In an embodiment, the AP selects the length of the TxOP based on both data and the sensing needs.

When a STA receives such an allocation, it shall fill the rest of the TxOP with known padding bits and transmit. The AP estimates CSI from the padding symbols in the end of the frame and the estimate is provided to the sensing server in addition to the estimates done on LTF.

Figure 3:
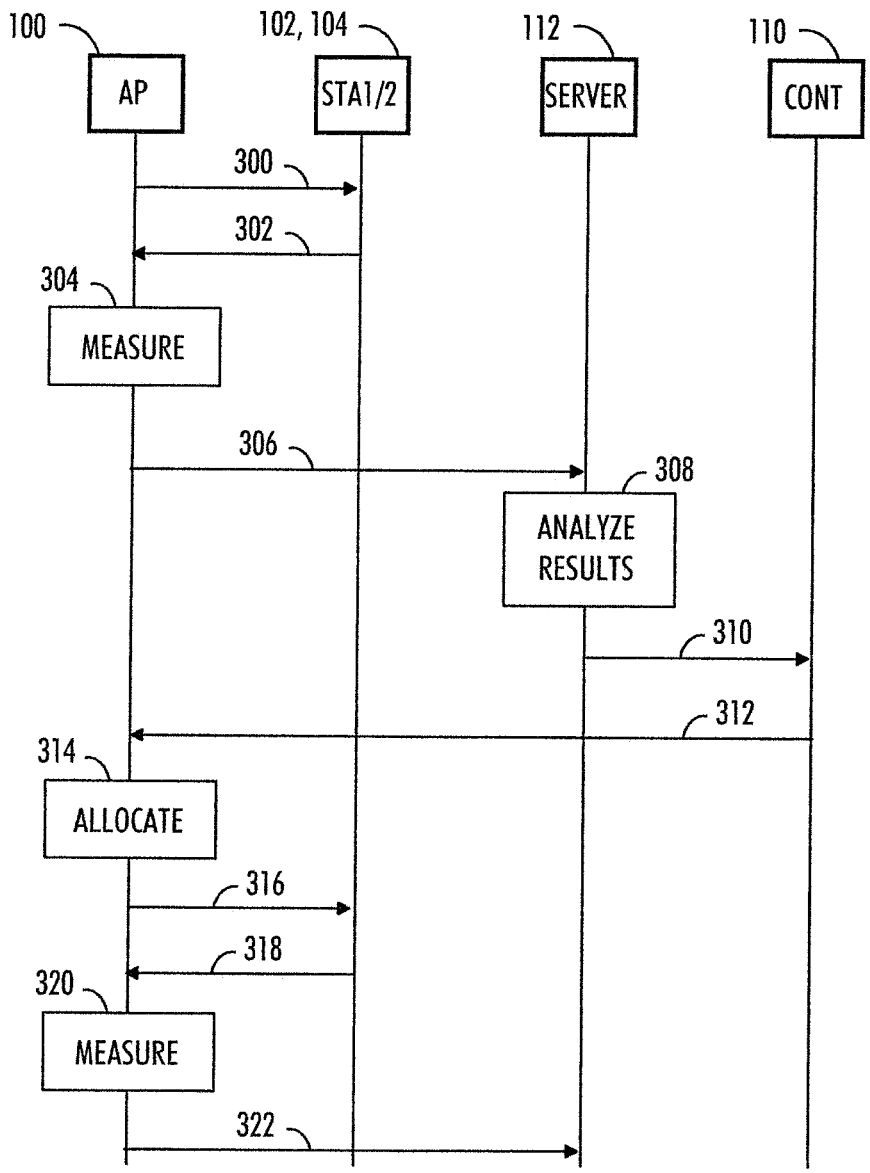
FIG. 3 is a signaling chart illustrating an embodiment of the invention.

FIG. 3 illustrates an embodiment. The figure illustrates a simplified signaling chart in connection with an embodiment. Communication between Access Point AP 100, Sending Server 112, optional Wi-Fi Controller 110 and wireless terminal devices, STAs 102, 104 is illustrated. The number of STAs here is two for simplicity, the number may be any other as one skilled in the art is aware. As mentioned above, the operations of the Wi-Fi Controller may also be divided to several apparatuses.

The AP 100 transmits a Trigger frame 300 to STAs 102, 104.

The STAs 102, 104 transmit OFDMA Data PDUs 302 to the AP. The AP measures 304 CSI from the Long training Field (LTF) of the PDUs, and reports 306 the CSI to the Sensing Server 112.

The Sensing Server 112 analyses 308 the results, possibly utilizing machine learning. If the server determines that there is not enough data available for obtaining a reliable results it may inform 310 the Wi-Fi Controller that data obtained from CSI is not good enough.

The Sensing Server 112 may be configured to continuously analyze 308 the CSI samples received from the AP to perform the actual sensing. This may be for example done using machine learning and/or artificial intelligence algorithms. The server also evaluates the accuracy and suitability of the incoming samples to e.g. filter out bad samples. While doing the filtering, it may apply an evaluation algorithm to decide whether samples related to transmissions from certain STA are good enough in general. In an embodiment, this may be implemented using a threshold for filtered accuracy and once the filtered accuracy drops below the threshold, the server may request the Wi-Fi network to use additional padding to improve the accuracy.

Another functionality of the accuracy evaluation algorithm may be to decide how much padding is needed. In an embodiment, there may be for example a function determining the correlation between the inaccuracy and the number of needed padding symbols to fix it.

The Wi-Fi Controller transmits a request 312 to AP 100 to perform more sensing measurements. In an embodiment, the Controller requests the AP to utilize additional padding in PDUs.

The AP receives from the server a request to perform sensing measurements and allocates 314 transmission resources to the STAs, where the allocated resources are larger than needed for data transmission of the one or more wireless terminal. In an embodiment, the AP may determine the amount of transmission resources to be allocated based on amount of data expected from the terminals. In an embodiment, the sensing needs are taken into account when determining the amount of resources.

The AP is aware of the amount of data the STAs are about to send. In an embodiment, the STAs transmit Buffer Status Reports (BSR) to the AP to let the AP schedule correct amount of uplink resources for the STAs. This is determined in the 802.11ax OFDMA standard proposal. Based on the BSR and also information on modulation and coding scheme (MCS) of the STA, the AP is aware how long transmission opportunity TxOP is needed for the STA data. There are also other ways to let the AP be aware of the amount of data.

Further, based on the sensing needs, the AP will extend the TxOP to be enough long to contain both data and sensing padding. In an embodiment, the sensing need means how long (in time/number of symbols) should the known signal be to make it possible for the AP to reliably do the sensing. This length may be determined at the Sensing Server according to machine learning algorithms, for example. The Sensing Server may inform the AP the sensing needs.

The AP 100 transmits a Trigger frame 316 to STAs 102, 104.

The STAs 102, 104 transmit OFDMA Data PDUs 318 to the AP, the PDU comprising extra padding in addition to data. The extra padding comprises symbols known to the AP 100.

The AP measures 320 CSI from the Long training Field (LTF) of the PDUs and the extra padding symbols, and reports 322 the CSI to the Sensing Server 112.

To use the additional padding symbols for the sensing, the content of them needs to be however known at the AP. However, in 802.11 specification it is said that the content of the padding symbols is undefined. There are various ways of solving this problem.

In an embodiment, there may be a vendor specific agreement on the content of the padding. In such case the use of padding symbols is workable among STAs and APs from the same vendor.

In an embodiment, the content of the padding symbols may be, as an example, dependent on the STA vendor and the AP may use the transmit address of the received frame to determine whether the AP knows the padding content used by the STA and if it does, it uses the padding to estimate CSI.

In an embodiment, the AP perform client profiling and learns the padding symbols utilized by each STA connected to it.

In an embodiment, STA may inform the padding to be used to the AP. Likewise, the AP may instruct via signalling the STA to use certain padding symbols.

The AP may, as an example, provide padding content in an information element in Beacon and Probe Response frames. All the associated STAs need to adopt the padding content indicated by the AP. The AP may indicate the padding content also in the association response frame it transmits to the STA.

Alternatively, the AP and the STA may negotiate on the padding content e.g. as part of the association procedure. A STA may indicate, as an example, the padding content it uses with an information element in the association request frame it transmits to the AP.

In an embodiment, it is possible to use some completely different content on the pure padding symbols. The STA could, for example, form similar content as in LTF, or some other waveform that provides better sensing accuracy. In case of MU-MIMO such special symbols should be however only put into the extra padding, to make sure it does not interfere with the other spatial stream.

It may be noted, that when the AP receives an uplink PDU with extra padding symbols, in addition to it knowing the content of the padding symbols, the AP needs to take into account the scrambling that is done in the STAs in. To be able to perform the sensing on the extra padding symbols, the AP needs to predict what is the scrambled content of the padding symbols. However, this is a trivial task when scrambler state and the original data are known.

Figure 4:
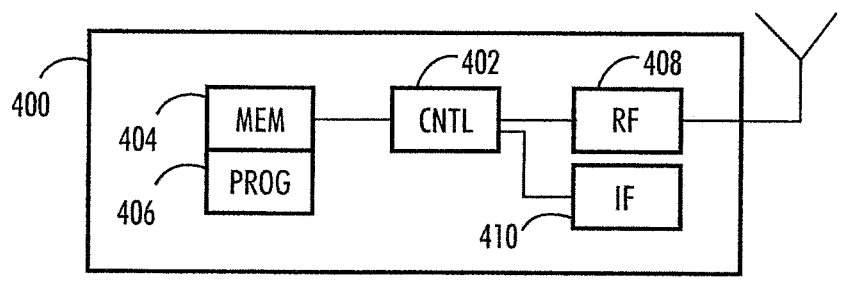
FIG. 4 illustrates an example of an apparatus employing some embodiments of the invention.

FIG. 4 illustrates an embodiment. The figure illustrates a simplified example of an apparatus applying embodiments of the invention.

In some embodiments, the apparatus may be an Access Point, AP, 100 or any other entity or network element of the communication system provided that the necessary inputs are available and required interfaces exists to transmit and receive required information.

In some embodiments, the apparatus may be a wireless terminal device, STAs 102, 104, or any other entity or network element of the communication system provided that the necessary inputs are available and required interfaces exists to transmit and receive required information.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 400 of the example includes a control circuitry 402 configured to control at least part of the operation of the apparatus. The control circuitry may be realized as a processor or more than one processors, for example. The apparatus may comprise a memory 404 for storing data. Furthermore the memory may store software 406 executable by the control circuitry 402. The memory may be integrated in the control circuitry.

The apparatus may comprise one or more interface circuitries 408, 410. The interface(s) may connect the apparatus to other network elements of the communication system. The interface(s) may provide a wired or wireless connection to the communication system. The interface(s) may be operationally connected to the control circuitry 402.

If the apparatus is an Access point, one of the interfaces may be a radio frequency interface providing a wireless connection to wireless terminal devices. Another interface may be a network interface providing the Access Point a connection to Sensing Server, Wi-Fi Controller and other networks.

If the apparatus is a wireless terminal device, one of the interfaces may be a radio frequency interface providing a wireless connection to wireless terminal devices. Another interface may be a radio interface of another communication system, such a cellular communication system, or a user interface, for example.

The software 406 may comprise a computer program comprising program code means adapted to cause the control circuitry 402 of the apparatus to perform the embodiments described above and in the claims.

In an embodiment, the apparatus comprises at least one processor or control circuitry 402 and at least one memory 404 including a computer program code 406, wherein the at least one memory and the computer program code are configured, with the at least one processor, to cause the apparatus to carry out the functionalities of the apparatus 400 according to any one of the embodiments of described above and in the claims.

According to an aspect, when the at least one processor or control circuitry 402 executes the computer program code, the computer program code causes the apparatus to carry out the functionalities according to any one of the embodiments described above and in the claims.

According to another embodiment, the apparatus comprises the at least one processor or control circuitry 402 and at least one memory 404 including a computer program code 406, wherein the at least one processor or control circuitry 402 and the computer program code 406 perform at least some of the functionalities of the apparatus 400 according to any one of the embodiments described above and in the claims. Accordingly, the at least one processor or control circuitry 402, the memory, and the computer program code form processing means for carrying out some embodiments of the present invention in the apparatus 400.

In an embodiment, the apparatus comprises means for receiving from a server a request to perform sensing measurements; means for allocating transmission resources to one or more wireless terminal devices, where the allocated resources are larger than needed for data transmission of the one or more wireless terminal; means for transmitting information on resource to the one or more wireless terminal devices; means for receiving transmission from one or more wireless terminal devices, the transmission comprising an amount of known symbols in addition to data; means for estimating channel state information utilizing the known symbols; and means for transmitting channel state information to the server.

In an embodiment, the apparatus comprises means for transmitting to an access point information on the amount of resources required for uplink data transmission; means for receiving an transmission resource allocation from an access point, where the allocated resources are larger than needed for data transmission; and means for transmitting using the allocated resources, where resources left over the data to be transmitted are filled with additional known symbols In an embodiment, the processes or methods described in above figures may also be carried out in the form of one or more computer processes defined by one or more computer program. A separate computer program may be provided in one or more apparatuses that execute functions of the processes described in connection with the figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. A communications apparatus, the apparatus comprising:
    at least one processor;
    at least one memory including computer program code;
    the at least one memory and the computer program code configured to, with the at least one processor, cause the apparatus to perform:
        receiving from a server a request to perform sensing measurements;
        allocating transmission resources to one or more wireless terminal devices, where the allocated resources are larger than needed for data transmission of the one or more wireless terminal devices, an amount of transmission resources not needed for data transmission being selected based on the request received from the server;
        transmitting information on resource to the one or more wireless terminal devices;
        receiving transmission from one or more wireless terminal devices, the transmission comprising an amount of known symbols in addition to data;
        estimating channel state information utilizing the known symbols; and
        transmitting channel state information to the server.

2. The apparatus of claim 1, the at least one memory and the computer program code configured to, with the at least one processor, cause the apparatus further to perform:
    allocating larger transmission resources for those wireless terminal devices which utilize Orthogonal Frequency Domain Multiple Access or Multi-User Multiple-Input-Multiple-Output in transmission.

3. The apparatus of claim 1, the at least one memory and the computer program code configured to, with the at least one processor, cause the apparatus further to perform:
    determining the amount of transmission resources to be allocated based on amount of data expected from the terminal devices.

4. The apparatus of claim 2, the at least one memory and the computer program code configured to, with the at least one processor, cause the apparatus further to perform:
    receiving from the one or more wireless terminal devices information on an amount of data to be expected from the terminal devices.

5. The apparatus of claim 1, the at least one memory and the computer program code configured to, with the at least one processor, cause the apparatus further to perform:
    indicating to the one or more terminal devices what known symbols the one or more terminal devices is to use.

6. The apparatus of claim 1, the at least one memory and the computer program code configured to, with the at least one processor, cause the apparatus further to perform:
    receiving from a terminal information on the known symbols.

7. The apparatus of claim 1, the at least one memory and the computer program code configured to, with the at least one processor, cause the apparatus further to perform:
    determining from transmission of a terminal the known symbols the terminal is using.

8. A method in a communication system, comprising:
    receiving from a server a request to perform sensing measurements;
    allocating transmission resources to one or more wireless terminal devices, where the allocated resources are larger than needed for data transmission of the one or more wireless terminal devices, an amount of transmission resources not needed for data transmission being selected based on the request received from the server;
    transmitting information on resource to the one or more wireless terminal devices;
    receiving transmission from one or more wireless terminal devices, the transmission comprising an amount of known symbols in addition to data;
    estimating channel state information utilizing the known symbols; and
    transmitting channel state information to the server.

9. The method of claim 8, further comprising:
    allocating larger transmission resources for those wireless terminal devices which utilize Orthogonal Frequency Domain Multiple Access or Multi-User Multiple-Input-Multiple-Output in transmission.

10. The method of claim 8, further comprising:
    determining the amount of transmission resources to be allocated based on amount of data expected from the terminal devices.

11. The method of claim 10, further comprising:
    receiving from the one or more wireless terminal devices information on the amount of data to be expected from the terminal devices.

12. The method of claim 8, further comprising:
    indicating to a terminal what known symbols the terminal is to use.

13. The method of claim 8, further comprising:
    receiving from a terminal information on the known symbols.

14. The method of claim 8, further comprising:
    determining from transmission of a terminal the known symbols the terminal is using.

15. A non-transitory computer readable medium comprising a computer program having instructions for causing an apparatus of a communication system to perform the method of claim 8.

* * * * *